Patented May 30, 1933

1,911,657

UNITED STATES PATENT OFFICE

SAMUEL ISIDOOR VLES, OF ARNHEM, NETHERLANDS, ASSIGNOR TO ALGEMEENE KUNSTZIJDE UNIE N. V., OF ARNHEM, NETHERLANDS, A JOINT STOCK COMPANY OF NETHERLANDS

PROCESS OF PREPARING PARTIALLY HYDROLYZED CELLULOSE ACETATES

No Drawing. Application filed October 29, 1928, Serial No. 315,935, and in the Netherlands November 23, 1927.

My invention relates to a process for the production of partially hydrolyzed cellulose acetates for the manufacture of products such as threads, films, bands, plastic masses, lacquers, varnishes and so on from cellulose acetate.

As the primary acetates when prepared in the usual way are insoluble in acetone and possess a weak dyeing property, these acetates are saponified or hydrolyzed. For instance, the cellulose acetate has been precipitated from the reaction mixture and this precipitate has been treated with inorganic acids or salts. This method which was before long abandoned, has been replaced by a process according to which the cellulose acetate in solution is treated with water, and in order to prevent local precipitation the water was mixed with acetic acid, with or without the addition of sulphuric acid. By controlling the quantity of water, sulphuric acid and of the time, various solubilities in acetone may be obtained in this way.

It appears that the viscosity of the hydrolyzed acetates depends upon two factors, i. e. upon the decomposition of the acetyl cellulose molecule, and upon the degree of the hydrolysis. It is desired to have the acetyl cellulose molecule decomposed as little as possible and to have the hydrolysis continued to such an extent that the desired solubility in acetone is obtained.

In general a saponifying agent which contains a certain amount of water is used. Part of this quantity of water is fixed by the excess of acetic acid anhydride which is always present in the acetyl mixture as in acetylating an excess of anhydride is always necessary; the remaining part of the water causes the saponifying reaction per se. If, for instance, 40 parts by weight of water are used, there remain not more than 32 parts of water. The quantity of water causing the saponification is, up to now, not more than 40% which is calculated on the dry cellulose.

According to my present invention better results are obtained by using an agent which contains more than 40 parts by weight of water calculated on 100 parts by weight of dry cellulose over the quantity of water necessary for binding the acetic acid anhydride which may be present.

This may be ascribed to the fact that in the presence of more water the hydration caused by the sulphuric acid is less perceptible. The viscosity of the solution of acetate in acetone is considerably increased. In this way one is able to increase the viscosity to the desired degree in connection with the aim in view.

In order to elucidate my invention the following example is given:

I take, for instance, 100 parts by weight of cellulose and by one of the usual methods of acetylating a solution is obtained containing 160 gr. of primary cellulose acetate, 60 gr. acetic acid anhydride, 780 gr. acetic acid and 14 gr. sulphuric acid. A mixture of 65 parts by weight of water and 45 parts by weight of acetic acid is added, the temperature being maintained at 20° C.; the use of excess of anhydride (60 gr.) about 10 gr. of water are bound, so that 55 gr. remain for the saponification.

The reaction is continued until the desired acetyl number is obtained. The viscosity of the solution in acetone of the saponified acetate is much higher than that obtained in saponifying with a smaller quantity of water.

An insight in the alteration of the viscosity by using more water is given in the following tables, showing the hydrolysis at a temperature of 20° C.; in the first instance an addition of 55 parts by weight of water and 55 parts by weight of acetic acid is used, and in the second instance an addition of 65 parts by weight of water and 45 parts by weight of acetic acid is used.

Table I

Temp. 20° C.—Addition 55 parts by wt. water 55 acetic acid (glacial)

| Days | Viscosity of the acetic acid solution | Viscosity of the 15% solution in acetone | Acetyl number according to Ost |
|---|---|---|---|
| 0 | 145 | Insoluble | |
| 2 | 138 | Insoluble | |
| 3 | 118 | 60 | 56.5 |
| 4 | 129 | 52 | 54.8 |
| 5 | 120 | 44 | 54.0 |
| 7 | 110 | 90 | 51.9 |

Table II

Temp. 20° C.—Addition 65 parts by wt. water 45 acetic acid (glacial)

| Days | Viscosity of the acetic acid solution | Viscosity of the 15% solution in acetone | Acetyl number according to Ost |
|---|---|---|---|
| 0 | 145 | Insoluble | |
| 2 | 100 | Insoluble | |
| 3 | 158 | 530 | 56.6 |
| 4 | 155 | 190 | 55.0 |
| 6 | 150 | 108 | 53.1 |
| 8 | 140 | 350 | 50.8 |

Although the saponification may be carried out at higher temperatures I have found that it is of advantage to use a temperature below 45° C. and preferably of 20° C. as due to this measure the viscosity is also increased.

At low temperatures a product of better quality is obtained than at higher temperatures.

I claim:—

1. Process of preparing partially hydrolyzed cellulose acetates for the manufacture of threads, films, bands, plastic masses, lacquers, varnishes and so on, in which process the cellulose acetates are hydrolyzed between 20° C. and 45° C. and with a saponifying agent containing more than 40 parts by weight of water, calculated on 100 parts by weight of the dry cellulose over the quantity of water necessary for binding the acetic acid anhydride, such excess quantity of water being an amount insufficient to cause precipitation of the acetates.

2. Process of preparing partially hydrolyzed cellulose acetates for the manufacture of threads, films, bands, plastic masses, lacquers, varnishes and so on, in which process the cellulose acetates are hydrolyzed between 20° C. and 45° C. with a saponifying agent containing more than 50 parts by weight of water calculated on 100 parts by weight of dry cellulose over the quantity of water necessary for binding the acetic acid anhydride, such excess quantity of water being an amount insufficient to cause precipitation of the acetates, for such an extended period that the viscosity of the solution in acetone of the acetate separated out exceeds a minimum viscosity and reaches a viscosity which is higher about 1½ times than said minimum viscosity.

3. Process of preparing partially hydrolyzed cellulose acetates for the manufacture of threads, films, bands, plastic masses, lacquers, varnishes and so on, in which process the cellulose acetates are hydrolyzed with a saponifying agent containing more than 50 parts by weight of water calculated on 100 parts by weight of dry cellulose over the quantity of water necessary for binding the acetic acid anhydride, such excess quantity of water being an amount insufficient to cause precipitation of the acetates, for such an extended period that the viscosity of the solution in acetone of the acetate separated out reaches a viscosity which is higher about 1½ times than a minimum viscosity reached during the treatment.

In testimony whereof I affix my signature.

SAMUEL ISIDOOR VLES.